US009718243B2

(12) United States Patent
Quinn et al.

(10) Patent No.: US 9,718,243 B2
(45) Date of Patent: Aug. 1, 2017

(54) METHOD OF MANUFACTURING A RIGID REPAIR WRAP INCLUDING A LAMINATE DISPOSED LATERALLY WITHIN THE REPAIR WRAP

(71) Applicant: Fiber Fix USA, LLC, Orem, UT (US)

(72) Inventors: Christopher Quinn, Orem, UT (US); Reed Quinn, Pleasant Grove, UT (US)

(73) Assignee: Fiber Fix USA, LLC, American Fork, UT (US)

( * ) Notice: Subject to any disclaimer, the term of this patent is extended or adjusted under 35 U.S.C. 154(b) by 0 days.

(21) Appl. No.: 14/207,290

(22) Filed: Mar. 12, 2014

(65) Prior Publication Data
US 2015/0047769 A1 Feb. 19, 2015

Related U.S. Application Data

(63) Continuation-in-part of application No. 13/970,228, filed on Aug. 19, 2013, and a continuation-in-part of
(Continued)

(51) Int. Cl.
*D06M 15/564* (2006.01)
*B29C 73/10* (2006.01)
*F16L 55/16* (2006.01)
*F16L 55/168* (2006.01)
*B32B 38/08* (2006.01)
(Continued)

(52) U.S. Cl.
CPC ............ *B29C 73/10* (2013.01); *F16L 55/16* (2013.01); *F16L 55/1686* (2013.01); *B29C 63/10* (2013.01); *B29K 2105/24* (2013.01); *B32B 38/08* (2013.01); *B32B 2038/0076* (2013.01); *B32B 2305/18* (2013.01); *B32B 2375/00* (2013.01); *B32B 2556/00* (2013.01)

(58) Field of Classification Search
USPC ........................................................ 427/358
See application file for complete search history.

(56) References Cited

U.S. PATENT DOCUMENTS 2,924,546 A 2/1960 Shaw
4,756,337 A 7/1988 Settineri
(Continued)

FOREIGN PATENT DOCUMENTS

EP 0531055 3/1993
WO 2009049383 4/2009

OTHER PUBLICATIONS

International Search Report and Written Opinion of the International Searching Authority (for PCT application No. PCTIB2014063600 which has claims that have some elements which are similar to the current application).
(Continued)

*Primary Examiner* — Alexander Weddle
(74) *Attorney, Agent, or Firm* — Dodd Call Black, PLLC; Dustin Call

(57) ABSTRACT

A repair wrap for repairing or strengthening an item. The repair wrap includes a fabric, where the fabric includes one or more fibers. The repair wrap also includes a film disposed laterally within the fabric. The repair wrap further includes a hardening material disposed in the fabric. The fabric is configured to be wrapped around a portion of an item. Curing the hardening material is configured to form a shell about the portion of the item.

18 Claims, 8 Drawing Sheets

Related U.S. Application Data application No. 13/970,230, filed on Aug. 19, 2013, and a continuation-in-part of application No. 13/970,238, filed on Aug. 19, 2013.

(51) Int. Cl.
*B29C 63/10* (2006.01)
*B32B 38/00* (2006.01)
*B29K 105/24* (2006.01)

(56) References Cited

U.S. PATENT DOCUMENTS

| | | | |
|---|---|---|---|
| 4,892,780 A | | 1/1990 | Cochran et al. |
| 5,348,801 A | | 9/1994 | Venzi et al. |
| 5,370,927 A | * | 12/1994 | Scholz et al. .................. 442/71 |
| 5,531,667 A | * | 7/1996 | Webb .................... A61F 13/04 602/41 |
| 5,665,056 A | * | 9/1997 | Nakasugi et al. ................ 602/8 |
| 5,732,743 A | | 3/1998 | Livesay |
| 5,786,408 A | | 7/1998 | Kuroda et al. |
| 6,543,487 B2 | | 4/2003 | Bazinet |
| 2003/0199215 A1 | * | 10/2003 | Bhatnagar et al. ........... 442/135 |
| 2004/0129373 A1 | | 7/2004 | Nadarajah et al. |
| 2006/0137756 A1 | | 6/2006 | Rice |
| 2006/0272724 A1 | | 12/2006 | Borland et al. |
| 2007/0125437 A1 | | 6/2007 | Lazzara |
| 2008/0216938 A1 | | 9/2008 | Rice |
| 2010/0062250 A1 | * | 3/2010 | Johnson et al. .............. 428/354 |
| 2010/0147409 A1 | | 6/2010 | Lu et al. |
| 2010/0154913 A1 | | 6/2010 | Brooks et al. |
| 2011/0203694 A1 | | 8/2011 | Brooks |
| 2011/0229698 A1 | | 9/2011 | Rasmussen et al. |

OTHER PUBLICATIONS

International Search Report and Written Opinion of the International Searching Authority (for PCT application No. PCTIB2014063601 which has claims that have some elements which are similar to the current application).

International Search Report and Written Opinion of the International Searching Authority (for PCT application No. PCTIB2014063602 which has claims that have some elements which are similar to the current application).

International Search Report and Written Opinion of the International Searching Authority (for PCT application No. PCTIB2014063603 which has claims that have some elements which are similar to the current application).

International Search Report and Written Opinion of the International Searching Authority (for PCT application No. PCTIB2014063604 which has claims that have some elements which are similar to the current application).

* cited by examiner

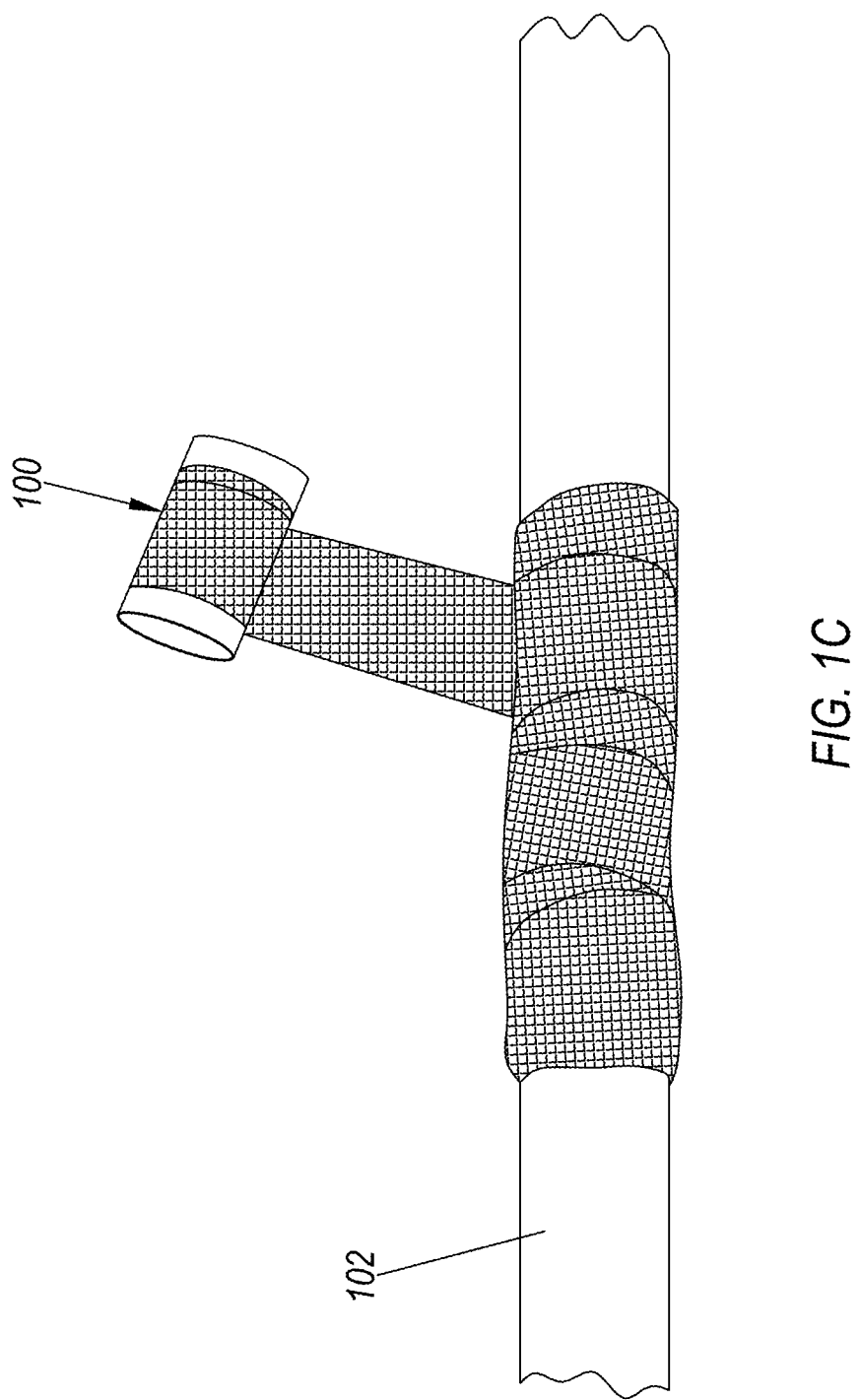

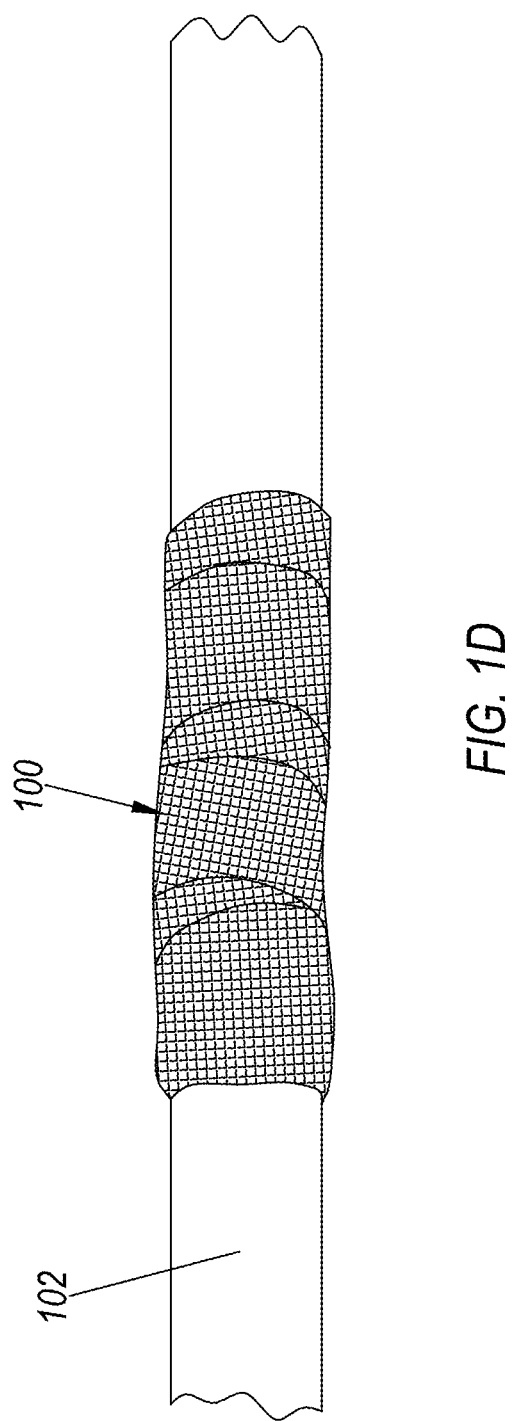

METHOD OF MANUFACTURING A RIGID REPAIR WRAP INCLUDING A LAMINATE DISPOSED LATERALLY WITHIN THE REPAIR WRAP

CROSS-REFERENCE TO RELATED APPLICATIONS

This application is related to co-pending U.S. patent application Ser. No. 14/207,276 filed on Mar. 12, 2014, and entitled, "RIGID REPAIR WRAP INCLUDING A LAMINATE DISPOSED LATERALLY WITHIN THE REPAIR WRAP", which application is incorporated herein by reference in its entirety.

This application is a continuation-in-part of, and claims the benefit of and priority to, U.S. Provisional patent application Ser. No. 13/970,228 filed on Aug. 19, 2013, which application is incorporated herein by reference in its entirety.

This application is a continuation-in-part of, and claims the benefit of and priority to, U.S. Provisional patent application Ser. No. 13/970,230 filed on Aug. 19, 2013, which application is incorporated herein by reference in its entirety.

This application is a continuation-in-part of, and claims the benefit of and priority to, U.S. Provisional patent application Ser. No. 13/970,238 filed on Aug. 19, 2013, which application is incorporated herein by reference in its entirety.

BACKGROUND OF THE INVENTION

When faced with the problem of a broken item, such as the handle of a gardening tool for example, a user generally has the choice of attempting to repair the item, or discarding the item and purchasing a replacement. Neither approach is particularly satisfactory.

For example, if the user should choose to replace the item, the user will incur the expense of the item and possibly other expenses, such as shipping and taxes. In terms of intangibles, the user must spend time to locate and purchase the item, when that time might be profitably employed in other pursuits. In other instances, where the item may be relatively uncommon, it may be difficult or impossible to find a suitable replacement. In such an instance, the user may have to strike a compromise and attempt to find a substitute that may or may not be fully satisfactory for its intended use.

Rather than attempting to find a replacement for the broken item, the user may attempt to repair the item, and thereby avoid some of the difficulties noted above. However, depending upon the item to be repaired and the type of damage, some breaks or other damage may not lend themselves to a wide range of remedies. Thus, a user may attempt to affect a repair of a broken item with materials such as duct tape or electrician's tape; however, such materials can deteriorate relatively quickly due to exposure to conditions such as moisture, sunlight, and abrasion. Moreover, where repair of a relatively rigid item, such as a tool handle for example, is desired, flexible materials such as the aforementioned tapes may not provide for a particularly effective repair.

Accordingly, there is a need in the art for a repair material that can allow a user to repair rather than replace an item. In addition, there is a need in the art for a repair material that can provide a rigid structure during the repair. Moreover, there is a need in the art for a repair material which adheres directly to the object in need of repair.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a repair wrap for repairing or strengthening an item. The repair wrap includes a fabric, where the fabric includes one or more fibers. The repair wrap also includes a film disposed laterally within the fabric. The repair wrap further includes a hardening material disposed in the fabric. The fabric is configured to be wrapped around a portion of an item. Curing the hardening material is configured to form a shell about the portion of the item.

Another example embodiment includes a repair wrap for repairing or strengthening an item. The repair wrap includes a fabric. The fabric includes one or more fibers and the one or more fibers are knit to form the fabric. The repair wrap also includes a film disposed laterally within the fabric. The repair wrap further includes a resin disposed in the fabric. The resin is water activated and configured to cure in exposure to air. The fabric is configured to be wrapped around a portion of an item. Curing the hardening material is configured to form a shell about the portion of the item.

Another example embodiment includes a repair wrap for repairing or strengthening an item. The repair wrap includes a fabric. The fabric includes one or more fibers and the one or more fibers are knit to form the fabric. The repair wrap also includes a polyurethane film disposed laterally within the fabric. The repair wrap further includes a resin disposed in the fabric. The resin is disposed on either side of the polyurethane film, water activated and configured to cure in exposure to air. The fabric is configured to be wrapped around a portion of an item. Curing the hardening material is configured to form a shell about the portion of the item.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1C shows the repair wrap being applied to the item;

FIG. 1D illustrates an item with the repair wrap cured to form a hardened shell on item;

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
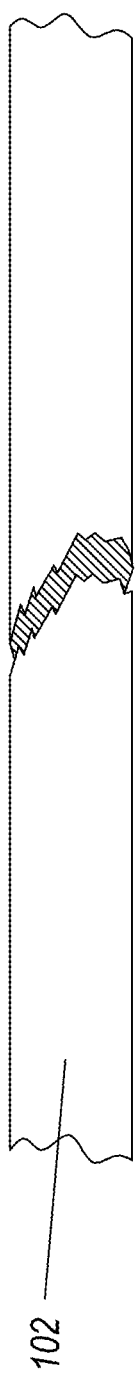
FIG. 1A illustrates a broken item on which a repair wrap can be used.
Figure 1B:
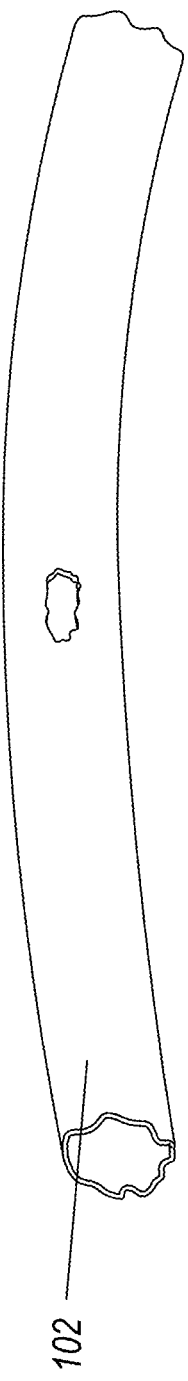
FIG. 1B illustrates an item with a hole on which a repair wrap can be used.

FIGS. 1A, 1B, 1C and 1D (collectively "FIG. 1") illustrate an example of a repair wrap 100 being applied to an item 102. FIG. 1A illustrates a broken item 102 on which a repair wrap can be used; FIG. 1B illustrates an item 102 with a hole on which a repair wrap can be used; FIG. 1C shows the repair wrap 100 being applied to the item 102; and FIG. 1D illustrates an item 102 with the repair wrap 100 cured to form a hardened shell on item 102. The repair wrap 100 can take the form of a roll so that the repair wrap 100 can be dispensed in a manner similar to that which would be used to dispense wrap from a roll of wrap. I.e. a roll allows a user to easily apply the repair wrap 100 using a circular motion around the item 102.

The repair wrap 100 may be used in the repair of an item 102 that has been broken, or in the attachment of one element to another, and the hardening material itself may be curable such that upon exposure of the hardening material to a curing agent such as light, heat, water and/or air for example, the hardening material will harden. The repair wrap 100 can be substantially watertight on item 102. For example, if item 102 is a water pipe or hose, for example, then the repair wrap needs to prevent water leakage to affect a repair of the inanimate object 302b.

The repair wrap 100 can be employed in a wide variety of applications. For example, the repair wrap 100 may be used to repair, temporarily or permanently, broken items. I.e., if an object has been broken, the two ends of the break can be positioned proximate to one another and the repair wrap 100 can be applied, securing the two ends of the break in their respective position. Additionally or alternatively, the repair wrap 100 may be used to join two or more elements together, even if the elements were not previously broken apart from each other, may be used to patch holes, may be used to strengthen an object or used for any other desired purpose.

In general, the repair wrap 100 may be employed to affect repairs of broken items that may be rigid, or relatively flexible. As used herein, the term 'repair' is intended to be broadly construed and includes, but is not limited to: the joining of two pieces of an item that have partially or completely broken apart from each other and/or the covering of a hole, crack or fracture in an item or restore or straighten a bent or folded item.

General areas of application include industry, home and garden, sporting goods, recreation, landscaping, automotive, military and agriculture. For example, the repair wrap 100 may be used in connection with a variety of different materials. Such materials include, but are not limited to, wood, metal, glass, plastic, rubber, composites, fiberglass, ceramic, concrete, and combinations of any of the foregoing.

E.g., the repair wrap 100 may be used to repair, temporarily or permanently, items such as garden tool handles, ski poles, hiking poles, golf clubs, baseball and softball bats, fishing rods, piping, tubing, sprinkler piping, tent poles, hoses, carbon bike frame tubes, oars, paddles, posts, rails, luggage racks, and furniture. In addition to use in the repair, or joining, of elements of the aforementioned inanimate objects, various specialized applications of the repair wrap 100 are also possible.

For example, the repair wrap 100 may be employed in connection with living matter, such as to graft tree limbs, and to repair tree limbs that have been damaged or broken. In this example application, the repair wrap 100 may take the form of a biodegradable resin and/or fabric that is compatible with the tree limbs. The resin may have a green color, or earth tone color, to better blend with the natural colors of the tree or other plant. However, the repair wrap 100 would not be advantageous for use in humans or animals. In particular, the repair wrap 100 has a number of properties that make it unsuitable for use on humans or animals. For example, some of the differences include:

Properties of Casting Tape for Humans:
1. Applied on top of a loose and porous layer of gauze or other pre-wrap;
2. Should always be applied by a trained professional to avoid additional damage;
3. Porous so sweat can evaporate;
4. Removable so that it can be removed easily when the bone heals;
5. Low density so it does not prevent x-ray passing through it;
6. Comes in long rolls to wrap a whole arm or leg, allows customization;
7. Low adhesive properties because it is applied over gauze and does not need to stick to a wide variety of surfaces.

Properties of Rigid Repair Wrap 100:
1. Applied directly to the desired area without intervening layers;
2. Can be applied easily, without training;
3. Water tight depending on wrapping technique;
4. Permanently affixed, it is not meant to come off easily;
5. High density to create desired sealing properties and strength of the wrap;
6. Comes in a small roll to allow for wrapping things with a small diameter like pipes and tool handles and allow users to use without cutting; and
7. Strong adhesive so that it sticks to almost any surface.

One of skill in the art will appreciate that if you wanted to repair a bone with the disclosed repair wrap 100, you would have to apply it directly to the bone and then remove the repair wrap 100 via surgery after healing. Because external casting allows for the healing without surgery, it is unlikely that the disclosed rigid repair wrap 100 would produce better results.

FIG. 1 shows that the repair wrap 100 can be wrapped around the inanimate object 102. Different wrapping techniques can provide different results and/or benefits, as described above. Wrapping, however, provides multiple layers which can strengthen one another and/or increase the water tightness of the final product. One of skill in the art will appreciate that the repair wrap 100 can be applied directly to the inanimate object 102. I.e., unlike a casting material which is used to cast a broken bone in a human or animal, the repair wrap 100 need not have any intervening layers. Indeed, repair wrap 100 can be configured to attach directly to the inanimate object 102 after hardening, which provides strength and does not allow separate parts to be removed from the hardened shell. As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

Figure 2:
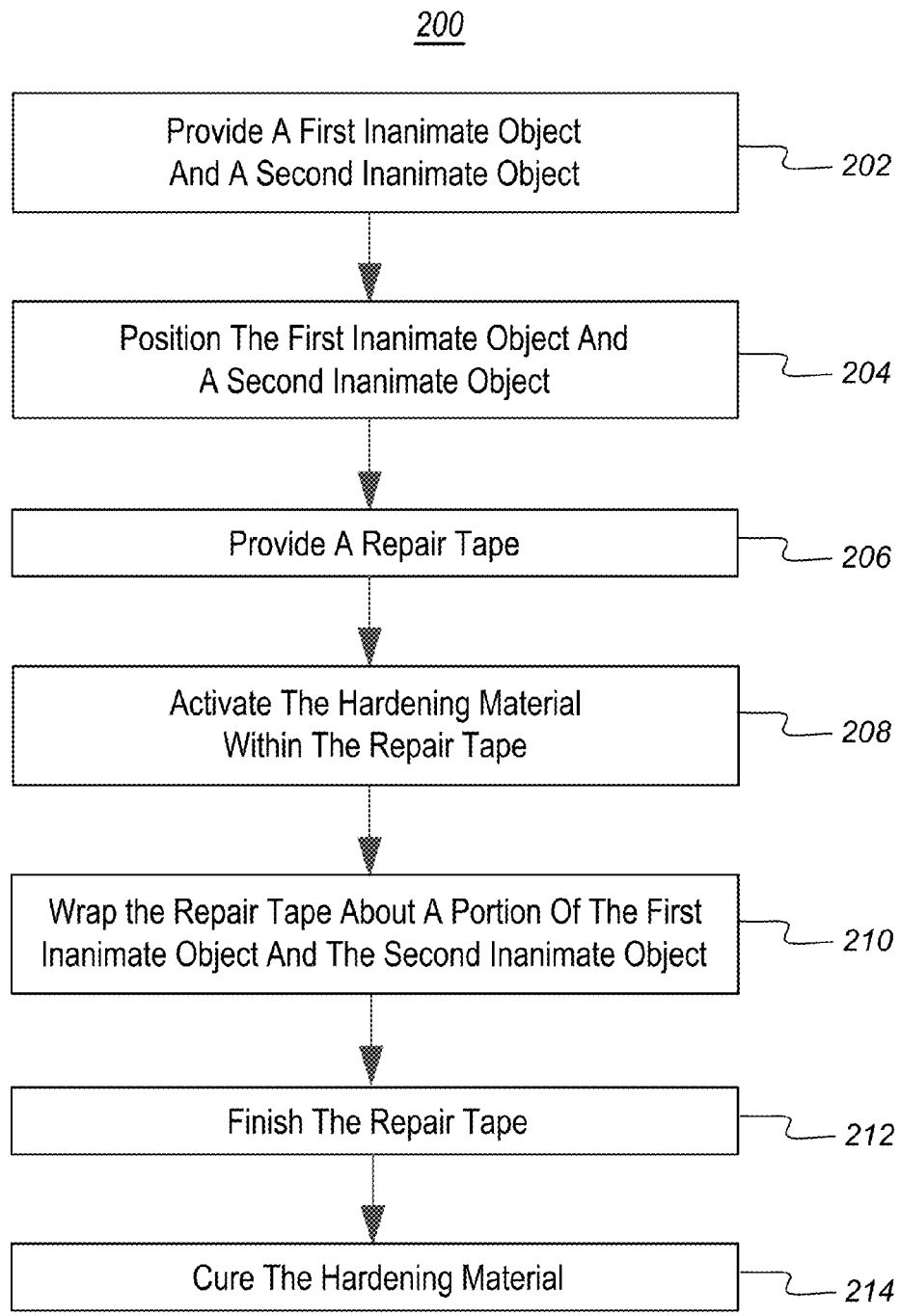
FIG. 2 is a flowchart illustrating a method of using a casting material for repairing, joining, securing or strengthening items.

After the repair wrap 100 has hardened, the hardened shell can then be processed, such as with sanding, painting or any other finishing method. Further, the hardened shell can secure the inanimate object 102 such that the inanimate object 102 is repaired and/or strengthened FIG. 2 is a flowchart illustrating a method 200 of using a repair wrap for repairing, joining, securing or strengthening items. In at least one implementation, the repair wrap can be any desired repair wrap, such as the repair wrap 100 of FIG. 1. Therefore, the method 200 will be described, exemplarily, with reference to the repair wrap 100 of FIG. 1. Nevertheless, one of skill in the art will appreciate that the method 200 can be used with repair wrap other than the repair wrap 100 of FIG. 1.

FIG. 2 shows that the method 200 can include providing 202 a first inanimate object and a second inanimate object. The first inanimate object and the second inanimate object can include any materials that the user seeks to repair, secure, strengthen or otherwise repair. For example, the first inanimate object and the second inanimate object can include an item that has broken, or partially broken. One of skill in the art will appreciate that, although two inanimate objects are discussed herein, the number of inanimate objects is exemplary and can include one, two, three or more inanimate objects.

FIG. 2 also shows that the method 200 can include positioning 204 the first inanimate object and the second inanimate objects. For example, the first inanimate object and the second inanimate object can be positioned 204 proximate to each other in the position in which the first inanimate object and the second inanimate object will be secured to one another. For example, if the first inanimate object and the second inanimate object are a single broken object, the broken ends can be placed proximate one another.

FIG. 2 further shows that the method 200 can include providing 206 a repair wrap. The repair wrap can include a fabric with an impregnated hardening material and can additionally include additives within the hardening material if so desired.

FIG. 2 additionally shows that the method 200 can include activating 208 the hardening material within the repair wrap. Activating 208 can be accomplished, for example, by exposing the hardening material to a curing agent such as light, water, heat, air, or a combination of any of the foregoing. For example, the hardening material may be immersed in, or otherwise exposed to, water that is in a temperature range of about 68 degrees F. to about 77 degrees F., although other temperatures and ranges can be employed. If required, excess activating agent can be removed from the repair wrap. For example, the excess activating agent can be removed by compressing the repair wrap, by exposing the repair wrap to air or by hanging the repair wrap.

FIG. 2 moreover shows that the method 200 can include wrapping 210 the repair wrap about a portion of the first inanimate object and a portion of the second inanimate object. I.e., the repair wrap can be wrapped 210 around the portion of the first inanimate object and the portion of the second inanimate object that are proximate one another such that the portion of the first inanimate object and the portion of the second inanimate object that are proximate one another are secured to one another. The repair wrap can be wrapped 210 directly on the surface of the portion of the first inanimate object and the second inanimate object. I.e., unlike casting tape for use with humans which is applied loosely over gauze or pre-wrap and functions like a splint, repair wrap is applied it directly to the surface of the first inanimate object and the second inanimate object. This method of repair enables types of repairs that are not possible using traditional tapes or other solutions. The wrapping technique depends on the type of repair.

For example, for high impact repairs you only need a few layers over the break and as much as possible on either side of the break to maximize the surface area. E.g., for high impact strength the repair wrap may be wrapped around the portion of the first inanimate object and the portion of the second inanimate object that are proximate one another so that each strip overlaps the previous strip by about 30 percent to about 40 percent of the width of the strip and repeating to create approximately three layers. Examples of high impact are things like hammers or axes or other tools that must withstand the load and vibrational force associated with repeated impacts and rebound.

For leak sealing repairs a different wrapping 210 pattern may be desired. For example, the surface area is not as critical. Instead, the number of layers over the leak can be adjusted to create a more water tight seal. E.g., 8-10 layers of repair wrap over the leak provide a more water tight seal. High load strength repairs require an intermediate approach. For example, the wrap needs to have 6-8 layers over the break but also 4-6 inches on either side of the break. As indicated above, the repair wrap can be placed directly on the first inanimate object and the second inanimate object. High load applications are things like shovels, pruning shears and other tools that use leverage as well as long skinny things like tent poles, fishing poles ski poles etc. that hold a relatively large amount of weight or tension for their size.

FIG. 2 also shows that the method 200 can include finishing 212 the repair wrap. For example, the repair wrap may be smoothed and more evenly distributed by rubbing the hardening material. This may be performed by hand or with a tool such as drywall knife. Additionally or alternatively, a material can be placed around the repair wrap to both compress and provide a desired texture on the outer surface, as described below.

FIG. 2 also shows that the method 200 can include curing 214 the hardening material. I.e., once the hardening material has been satisfactorily distributed and smoothed, it can then be allowed to harden. One of skill in the art will appreciate that the curing 214 time is extremely sensitive to temperature. The higher the temperature the shorter the curing 214 time, the lower the temperature the longer the curing 214 time. In addition, for some hardening materials, there are two curing 214 times, one for the initial cure when the hardening material is no longer a liquid or no longer workable. The final cure is when the hardening material has reached its peak strength. The final cure time is roughly four times as long as the initial cure.

When the hardening material has cured 214 repair wrap may form a relatively hard shell disposed about the joint between the two pieces to be joined together (or disposed over a hole to be patched or form a shell over the piece to be strengthened depending on how the repair wrap is being used). This hard shell can then be further finished 212 if desired, although such processing is not necessary. Such processing may include one or more of sanding, cutting, buffing, smoothing, shaping, forming, texturing, painting, sealing, compressing or priming.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
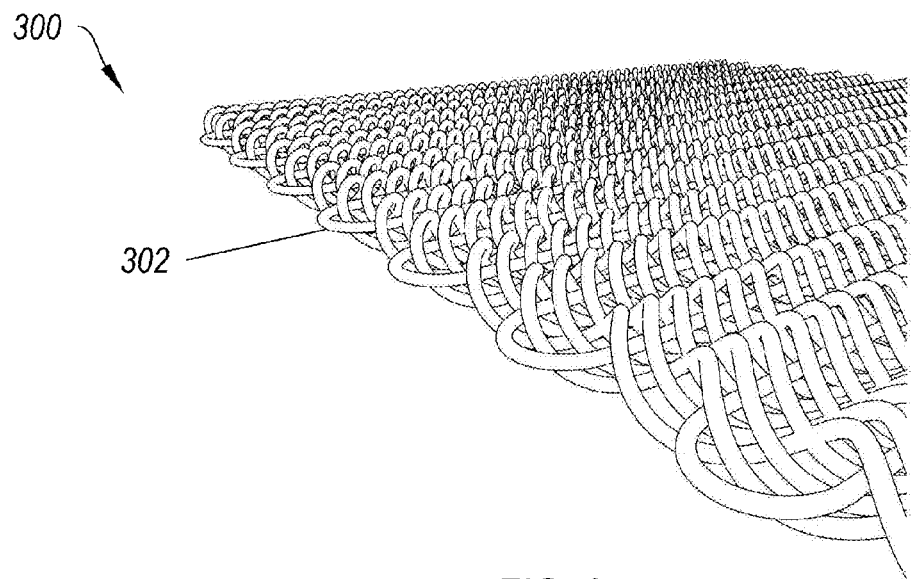
FIG. 3 illustrates an example of a knit fabric for use in a repair wrap.

FIG. 3 illustrates an example of a knit fabric 300 for use in a repair wrap. The knit fabric 300 can include any fabric that provides the desired properties, which may vary depending on intended use. For example, the area density of knit fabric 300 that provide the most beneficial properties are between 180 grams per square meter and 450 grams per square meter and it becomes ineffective with fabric contain containing less than 100 grams per square meter or more than 500 grams per square meter.

Additionally or alternatively, the knit fabric 300 may take a variety of shapes and configurations. For example, the knit fabric 300 may be in sheet form, or in strips of a desired length and width. Alternatively, the knit fabric 300 can be in the form of wrap, which may or may not be in a roll, of a desired width. As well, the thickness of the knit fabric 300 can be selected, as described above.

FIG. 3 shows that the knit fabric 300 can include one or more fibers 302. The fiber 302 can be of any desired material which provides the desired characteristics. For example, the knit fabric 300 can include natural and/or synthetic fibers 302 which may or may not be biodegradable. The fibers 302 can be selected for one or more desirable properties. Such properties can include fire-resistance, water-resistance, mold-resistance, fungus-resistance, heat-resistance, tear-resistance, to name a few examples.

Fiberglass:

Fiberglass is extremely strong and inexpensive. It is easy to manufacture and there are many types of commercially available woven, non-woven and knit cloths. Fiberglass is brittle, it is very strong but when it breaks it shatters and the splinters can be sharp and dangerous. When you sand it the fibers 302 can cause skin irritation. Fiberglass has low absorption properties (e.g., it would be difficult to clean up a pool of water with a fiberglass cloth). Any low viscosity material has to be forced into it under pressure and my not stay adhered will to the fibers 302 even after saturation. This makes it more difficult to manufacture a pre-impregnated knit fabric 300. Fiberglass also has the characteristic that the fibers 302 themselves are brittle and cannot be creased. If you crease the fibers 302 they will break and the cloth will lose all of its strength. This also limits how tightly you can knit the fabric. If the loops are too tight and the cloth will be very weak because the fibers 302 themselves will break when forced into a tight loop.

Carbon Fiber:

Carbon fiber is much stronger than fiberglass. But it is also much more expensive (8-10 times more expensive) than fiberglass. Like fiberglass it is brittle so it is hard to break but when it does it shatters and the splinters can be skin irritants. It does not sand well but it absorbs resin slightly better than fiberglass. Carbon fiber is more suitable for extreme applications like those used by the military or construction industry.

Aramids and Para-Aramid Synthetic Fibers:

The most famous of these fibers is KEVLAR (a para-aramid fiber with the molecular formula [—CO—C6H4-CO—NH—C6H4-NH-]n) but there are other fibers 302 such as Nomex, Technora and others. These fibers 302 are stronger and less brittle than fiberglass but not as strong as carbon fiber. They are also more expensive than fiberglass (2-3 times) but still much less expensive than carbon fiber. These fabrics are less brittle than fiberglass or carbon fiber and so they result in softer and more flexible cloths. This produces a repair wrap 100 that has extremely high impact strengths. Aramids and para-aramid fibers 302 can be used alone, in combination with one another, or combined with fiberglass and/or carbon fiber or in combination with other fibers 302.

Basalt:

Basalt is manufactured the same way as fiberglass. Rather than melting down and extruding glass Basalt fibers 302 are extruded volcanic rock. Basalt is more expensive than fiberglass and has many of the same cons (it is brittle, cannot be creased, etc.). It is slightly stronger than fiberglass but its main strength when compared to fiberglass is that it is extremely heat and chemical resistant. For example, knit fabric 300 that includes basalt can be used in high temperature situations. For example, the repair wrap 100 that includes basalt can be used to repair a tail pipe on a car, or a pipe that was going to be exposed to open flames.

Polyester, Nylon and Other Plastic Fibers:

These fibers 302 are extremely strong and inexpensive. Unlike most of the above fibers 302 they do not irritate the skin if you sand them or break them. They can take a lot of vibration and impact because they are more flexible where the fibers 302 above are more brittle. These fibers 302 can take more total load per weight than fiberglass but they start to deform at lower weights. For example, one experiment was conducted with similar fabrics 300 comparing polyester and fiberglass. 1500 pounds of weight was placed on two pieces of metal pipe that were held together with repair wrap 100 where the knit fabric 300 was polyester and two pieces of identical pipe held together with repair wrap 100 where the knit fabric 300 was fiberglass. The fiberglass application stayed straight under the load and the polyester started to deform. However, at 2000 lbs. the fiberglass shattered the polyester did not. The polyester application bent like a V but it held the weight whereas the fiberglass did not.

Natural Fibers:

Natural fibers 302 are a very broad category. These could be plant fibers 302 like Hemp, Cotton or bamboo or animal fibers 302 like Silk, wool, or even Spider Silk. Natural fibers 302 tend to be expensive, and difficult to work with (because they are not uniformly manufactured). They can be just as strong as or even stronger than many of the synthetic fibers 302. The main advantage with natural fibers 302 over all of the synthetic fibers 302 above is that they are biodegradable. For example, if you used a natural fiber 302 to repair a broken tree limb that snapped during a wind storm you would not want the knit fabric 300 to remain in place permanently or else the limb would not be able to continue to grow. Natural fibers 302 would eventually degrade, such that the repair wrap 100 could be removed easily after the branch had healed or would naturally fall apart as the healed limb continued to grow.

FIG. 3 also shows that the knit fabric 300 can include a knit. When the fibers 302 are knit, the gaps between fibers 302 tends to be very uniform, meaning that the gap size is known and can be accounted for in the configuration of an embedded hardening material, as described below. A knit fabric 300 includes a knit fabric 300 formed by interlacing yarn or thread in a series of connected loops. I.e., a knit fabric 300 includes looped fibers 302. These loops tend to be fairly uniform in size, providing a repair wrap with a consistency that allows the hardening material to be embedded more easily than woven or felt knit fabric 300s.

A knit fabric 300 consists of a number of consecutive rows of loops, called stitches 300. As each row progresses, a new loop is pulled through an existing loop. The active stitches 300 are held on a curved, straight or inside a hollow needle until another loop can be passed through them. This process eventually results in a fabric 300. Knitting may be done by hand or by machine. There exist numerous styles and methods of both hand and machine knitting. Different types of yarns and needles may be used to achieve a plethora of knitted materials; these tools give the final piece a different color, texture, weight, and/or integrity. Other factors that affect the end result include the needle's shape, thickness and malleability, as well as the yarn's fiber 302 type, texture and twist.

The knit fabric 300 for use with a repair tape 300 must be consistent and an optimal knit size should be used to ensure that the hardening material becomes embedded, as described below. Therefore, the gauge of the knit (i.e., stitches per inch) is critical to ensure that the gaps are of the correct size. For example, if the gauge is too high then the gaps will be too small and the hardening material will be excluded from the gaps. In contrast, if the gauge is too low then the gaps will be too large and the fabric will create a sufficient framework for the hardening material. Therefore, the gauge can be between 11 stitches per inch and 17 stitches per inch. E.g. the gauge can be approximately 14 stitches per inch. As used in the specification and the claims, the term approximately shall mean that the value is within 10% of the stated value, unless otherwise specified.

Figure 4:
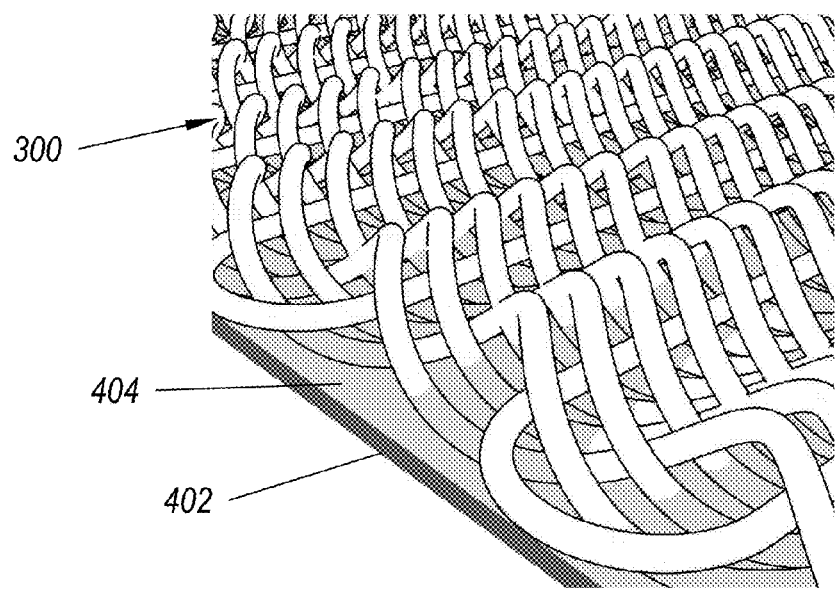
FIG. 4 illustrates an example of a backer paper on the knit fabric.

FIG. 4 illustrates an example of a backer paper 402 on the knit fabric 300. The backer paper 402 is configured to secure a laminate in place while it solidifies, allowing for a repeatable laminate to be placed in the knit fabric 300. The backer paper 402 can include paper or any other suitable material. For example, the backer paper 402 can include a waxed paper which protects the laminate from adhering to the backer paper 402.

FIG. 4 shows that the backer paper 402 includes liquid polyurethane (PU) laminate 404. Polyurethane is a polymer composed of a chain of organic units joined by carbamate (urethane) links. The backer paper 402 and the knit fabric 300 and pressed together saturating the portion of the knit fabric 300 nearest the backer paper 300 with the liquid PU laminate 404. The liquid PU laminate 404 will harden forming a water impermeable barrier that will secure the hardening material within the knit fabric, as described below. After the liquid PU laminate 404 forms a film, the backer paper 402 can then be removed, leaving the film in place. The backer paper 402 can then be reused if so desired. I.e., the PU laminate 404 includes a solvent that keeps the PU laminate 404 in a liquid form. As the solvent evaporates, the PU laminate 404 forms a solid film which is left behind.

Figure 5A:
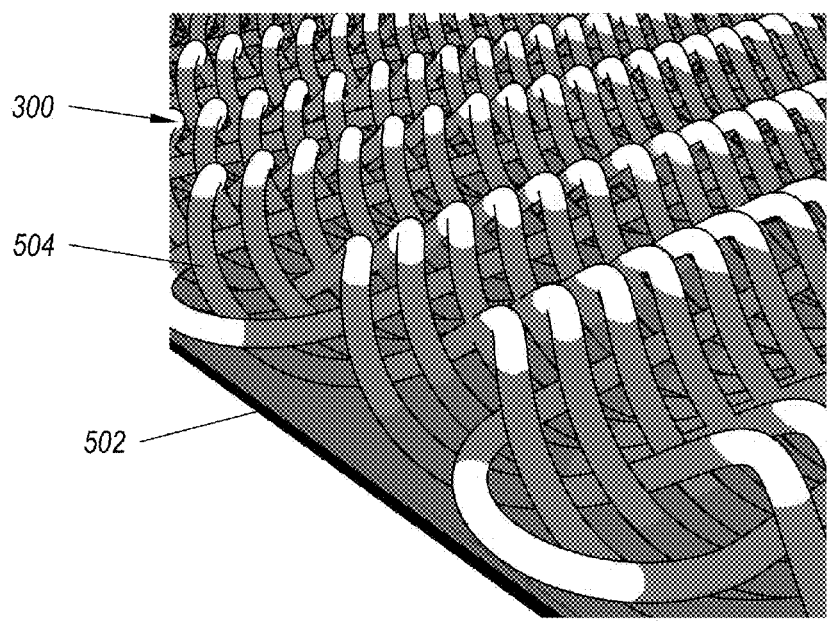
FIG. 5A illustrates a top perspective view of the knit fabric with a PU film.
Figure 5B:
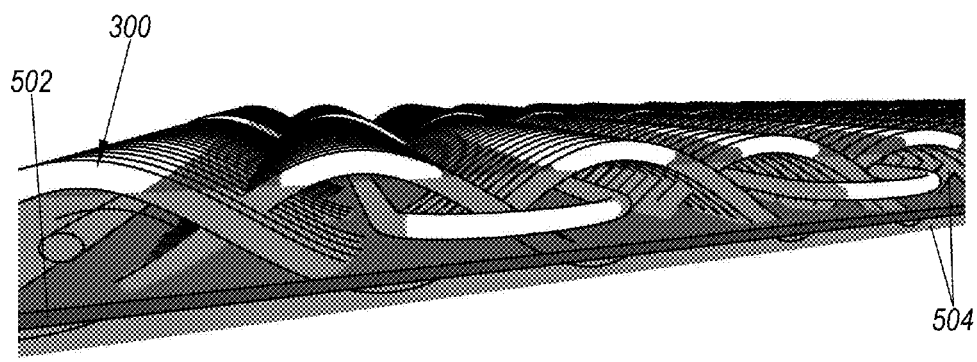
FIG. 5B illustrates a side view of the knit fabric with a PU film.

FIG. 5 illustrates a knit fabric 300 with a PU film 502. FIG. 5A illustrates a top perspective view of the knit fabric 300 with a PU film 502; and FIG. 5B illustrates a side view of the knit fabric 300 with a PU film 502. The PU film 502 is disposed laterally within the knit fabric 300. I.e., the PU film 502 is parallel to the surfaces of the knit fabric 300. The PU film includes a number of properties that make it advantageous in use with a knit fabric 300. For example, the hardness of the PU film 502 can be adjusted and the film can be elongated without being damaged. I.e., the PU film 502 undergoes elongation before breaking. The PU film 502 also has excellent memory, meaning that it will return to its original dimensions after being stretched to its limit. Further, the PU film 502 retains its original performance characteristics including its tensile strength. Moreover, the PU film 502 can be colored with a dye, making it easily identifiable when on the knit fabric 300. Additionally or alternatively, the PU film 502 can be extremely thin. For example, the PU film 502 can be between 0.1 and 0.2 millimeters thick.

FIG. 5 also shows that the knit fabric 300 can include a hardening material 504. The hardening material 504 can be impregnated within the fabric 102 on either side of the PU film or on both sides of the PU film 502. The PU film 502 creates a water tight barrier. Without the barrier the water activated hardening material 504 (which is still liquid in the final product) does not always seal all the gaps in the knit fabric 300. After the hardening material 504 is activated it gives off a small amount of gas as it cures. The bubbles of gas can create small channels through the hardening material 504 that water can flow through after the hardening material 504 hardens causing the repair to leak. By adding a flexible, solid PU film 502 in the middle of the composite a much more consistent water tight seal is achieved.

Additionally or alternatively, the PU film 502 ensures that the hardening material 504 remains in the correct position until activated. The hardening material 504 can include any compound which is configured to harden and secure the knit fabric 300 in place. I.e., the hardening material 504 will be cured and harden into a set configuration. The cured hardening material 504 and the knit fabric 300 will then provide the properties of the repair wrap, as discussed above.

The ratio of hardening material to fabric is critical to produce the desired properties. The ideal amount of hardening material 504 is the amount that just barely but completely saturates the cloth. For example, the ratio of hardening material 504 can be between 29 percent and 44 percent hardening material to fiber by weight. E.g., the ratio of hardening material 504 can be approximately 36.5% hardening material to knit fabric 300 by weight. The hardening material 504 may give off gas as it cures. The gas from the curing process forms tiny bubbles that can connect together and migrate during the curing process leaving channels for water to leak through, ruining the water tight seal. The more hardening material 504 the more gas is generated. Therefore, too much hardening material 504 will ruin the water tight property of the wrap. Likewise, too little hardening material 504 is just as problematic. Fibers within the knit fabric 300 are inherently porous. If there is too little hardening material 504 there will be dry places in the fibers and the repair will leak. Additionally, dry places in the knit fabric 300 will significantly reduce the strength and rigidity of the repair.

The hardening material 504 can include any desired material. For example, the hardening material 504 can include resin or any other hardening material. Resin can include high bond strength epoxies, single stage as well as two part epoxies consisting of a resin and a hardener where the hardener is activated at some desired time. For example, the resin can include polyester resins both saturated and unsaturated. The resins can also be classified as a pre-mixed two part epoxy where one part is a moisture activated hardener. Resins are often characterized by the isocyanates that they contain. E.g., the resin can include MDI (methylene diphenyl diisocyanate) which has the lowest toxicity of the commonly available isocyanates. Resins containing other common isocyanates like TDI, HDI or IPDI may also be used.

Additionally or alternatively, the hardening material 504 can include an additive. For example, the additive can include plastic, rubber, sand, wood particles, sawdust, fibrous material, polyester fibrous material or any other desired additive. The additives may or may not be biodegradable. In addition, the additives can be substantially non-toxic, allowing them to be handled during application and to repair items where non-toxic resins would be desirable, for example in repairing pipes that will carry drinking water.

The hardening material 504 can be impregnated in the fabric 102 using any desired method. In particular, impregnating the hardening material 504 should remove as many air spaces as possible. For example, the hardening material 504 can be pushed into the fabric 102 using rollers in order to remove air or other gaps from the hardening material 504. This can increase water resistance and hardness consistency of the final repair.

Figure 6:
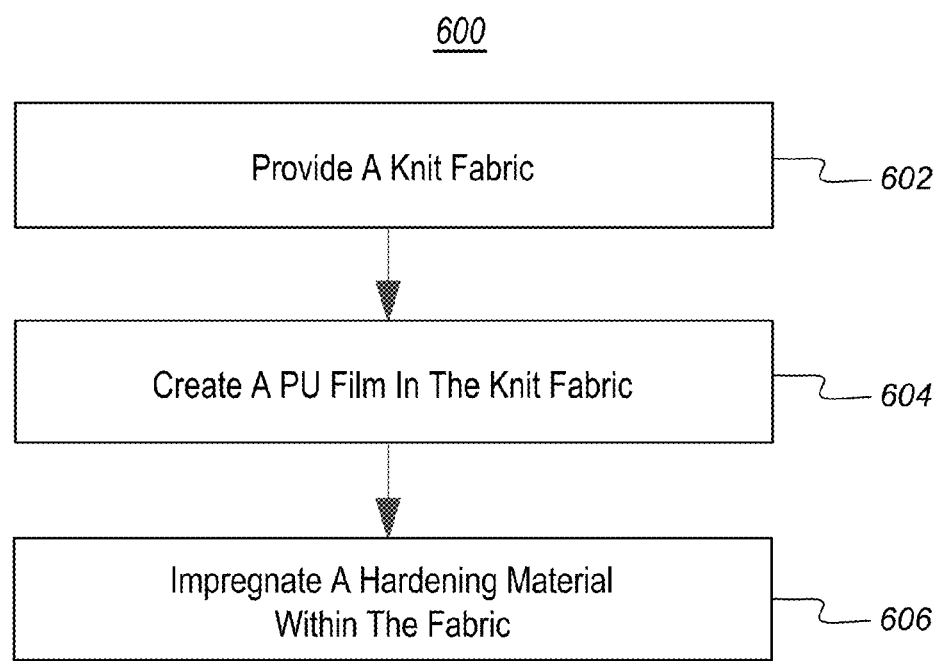
FIG. 6 is a flow chart illustrating a method of manufacturing a repair wrap.

FIG. 6 is a flow chart illustrating a method 600 of manufacturing a repair wrap. The repair wrap can include the repair wrap 100 of FIGS. 1 and 3-5. Therefore, the method 600 will be described, exemplarily, with reference to the repair wrap 100 of FIGS. 1 and 3-5. Nevertheless, one of skill in the art can appreciate that the method 600 can be used to produce repair wrap other than the repair wrap 100 of FIGS. 1 and 3-5.

FIG. 6 shows that the method 600 can include providing 602 a knit fabric. The knit fabric can include any fabric that provides the desired properties, which may vary depending on intended use. For example, the area density of knit fabric that provide the most beneficial properties are between 180 grams per square meter and 450 grams per square meter and it becomes ineffective with fabric contain containing less than 100 grams per square meter or more than 500 grams per square meter.

Additionally or alternatively, the knit fabric may take a variety of shapes and configurations. For example, the knit fabric may be in sheet form, or in strips of a desired length and width. Alternatively, the knit fabric can be in the form of wrap, which may or may not be in a roll, of a desired width. As well, the thickness of the knit fabric can be selected, as described above.

The knit fabric can include one or more fibers. The fiber can be of any desired material which provides the desired characteristics. For example, the knit fabric may include, non-woven fibers including felts and chop strand fabrics, woven fibers including twills plain weaves and roving weaves, knit fibers, or any other desired fibers and/or patterns. For example, the knit fabric can include natural and/or synthetic fibers which may or may not be biodegradable. The fibers can be selected for one or more desirable properties. Such properties can include fire-resistance, water-resistance, mold-resistance, fungus-resistance, heat-resistance, tear-resistance, to name a few examples.

When the fibers are knit, the gaps between fibers tends to be very uniform, meaning that the gap size is known and can be accounted for in the configuration of an embedded hardening material, as described below. A knit fabric includes a knit fabric formed by interlacing yarn or thread in a series of connected loops. I.e., a knit fabric includes looped fibers. These loops tend to be fairly uniform in size, providing a repair wrap with a consistency that allows the hardening material to be embedded more easily than woven or felt knit fabrics.

A knit fabric consists of a number of consecutive rows of loops, called stitches. As each row progresses, a new loop is pulled through an existing loop. The active stitches are held on a curved, straight or inside a hollow needle until another loop can be passed through them. This process eventually results in a fabric. Knitting may be done by hand or by machine. There exist numerous styles and methods of both hand and machine knitting. Different types of yarns and needles may be used to achieve a plethora of knitted materials; these tools give the final piece a different color, texture, weight, and/or integrity. Other factors that affect the end result include the needle's shape, thickness and malleability, as well as the yarn's fiber type, texture and twist.

The knit fabric for use with a repair tape must be consistent and an optimal knit size should be used to ensure that the hardening material becomes embedded, as described below. Therefore, the gauge of the knit (i.e., stitches per inch) is critical to ensure that the gaps are of the correct size. For example, if the gauge is too high then the gaps will be too small and the hardening material will be excluded from the gaps. In contrast, if the gauge is too low then the gaps will be too large and the fabric will create a sufficient framework for the hardening material. Therefore, the gauge can be between 11 stitches per inch and 17 stitches per inch. E.g. the gauge can be approximately 14 stitches per inch.

FIG. 6 also shows that the method 600 can include creating 604 a PU film in the knit fabric. The PU film is disposed laterally within the knit fabric. I.e., the PU film is parallel to the surfaces of the knit fabric. The PU film includes a number of properties that make it advantageous in use with a knit fabric. For example, the hardness of the PU film can be adjusted and the film can be elongated. I.e., the PU film undergoes elongation before breaking. The PU film also has excellent memory, meaning that it will return to its original dimensions after being stretched to its limit. Further, the PU film retains its original performance characteristics including its tensile strength. Moreover, the PU film can be colored with a dye, making it easily identifiable when on the knit fabric. Additionally or alternatively, the PU film can be extremely thin. For example, the PU film can be between 0.1 and 0.2 millimeters thick.

FIG. 6 also shows that the method can include impregnating 606 a hardening material within the fabric. The hardening material can be impregnated 606 within the fabric on either side of the PU film or on both sides of the PU film. The PU film creates a water tight barrier. Without the barrier the water activated hardening material (which is still liquid in the final product) does not always seal all the gaps in the knit fabric. After the hardening material is activated it gives off a small amount of gas as it cures. The bubbles of gas can create small channels through the hardening material that water can flow through after the hardening material hardens causing the repair to leak. By adding a flexible, solid PU film in the middle of the composite a much more consistent water tight seal is achieved.

Additionally or alternatively, the PU film ensures that the hardening material remains in the correct position until activated. The hardening material can include any compound which is configured to harden and secure the knit fabric in place. I.e., the hardening material will be cured and harden into a set configuration. The cured hardening material and the knit fabric will then provide the properties of the repair wrap, as discussed above.

The ratio of hardening material to fabric is critical to produce the desired properties. The ideal amount of hardening material is the amount that just barely but completely saturates the cloth. For example, the ratio of hardening material can be between 29 percent and 44 percent hardening material to fiber by weight. E.g., the ratio of hardening material can be approximately 36.5% hardening material to knit fabric by weight. The hardening material may give off gas as it cures. The gas from the curing process forms tiny bubbles that can connect together and migrate during the curing process leaving channels for water to leak through, ruining the water tight seal. The more hardening material the more gas is generated. Therefore, too much hardening material will ruin the water tight property of the wrap. Likewise, too little hardening material is just as problematic. Fibers within the knit fabric are inherently porous. If there is too little hardening material there will be dry places in the fibers and the repair will leak. Additionally, dry places in the knit fabric will significantly reduce the strength and rigidity of the repair.

The hardening material can include any desired material. For example, the hardening material can include resin or any other hardening material. Resin can include high bond strength epoxies, single stage as well as two part epoxies consisting of a resin and a hardener where the hardener is activated at some desired time. For example, the resin can include polyester resins both saturated and unsaturated. The resins can also be classified as a pre-mixed two part epoxy where one part is a moisture activated hardener. Resins are often characterized by the isocyanates that they contain. E.g., the resin can include MDI (methylene diphenyl diisocyanate) which has the lowest toxicity of the commonly available isocyanates. Resins containing other common isocyanates like TDI, HDI or IPDI may also be used.

Additionally or alternatively, the hardening material can include an additive. For example, the additive can include plastic, rubber, sand, wood particles, sawdust, fibrous material, polyester fibrous material or any other desired additive. The additives may or may not be biodegradable. In addition, the additives can be substantially non-toxic, allowing them to be handled during application and to repair items where non-toxic resins would be desirable, for example in repairing pipes that will carry drinking water.

The hardening material can be impregnated 606 in the fabric using any desired method. In particular, impregnating the hardening material should remove as many air spaces as possible. For example, the hardening material can be pushed into the fabric using rollers in order to remove air or other gaps from the hardening material. This can increase water resistance and hardness consistency of the final repair.

Figure 7:
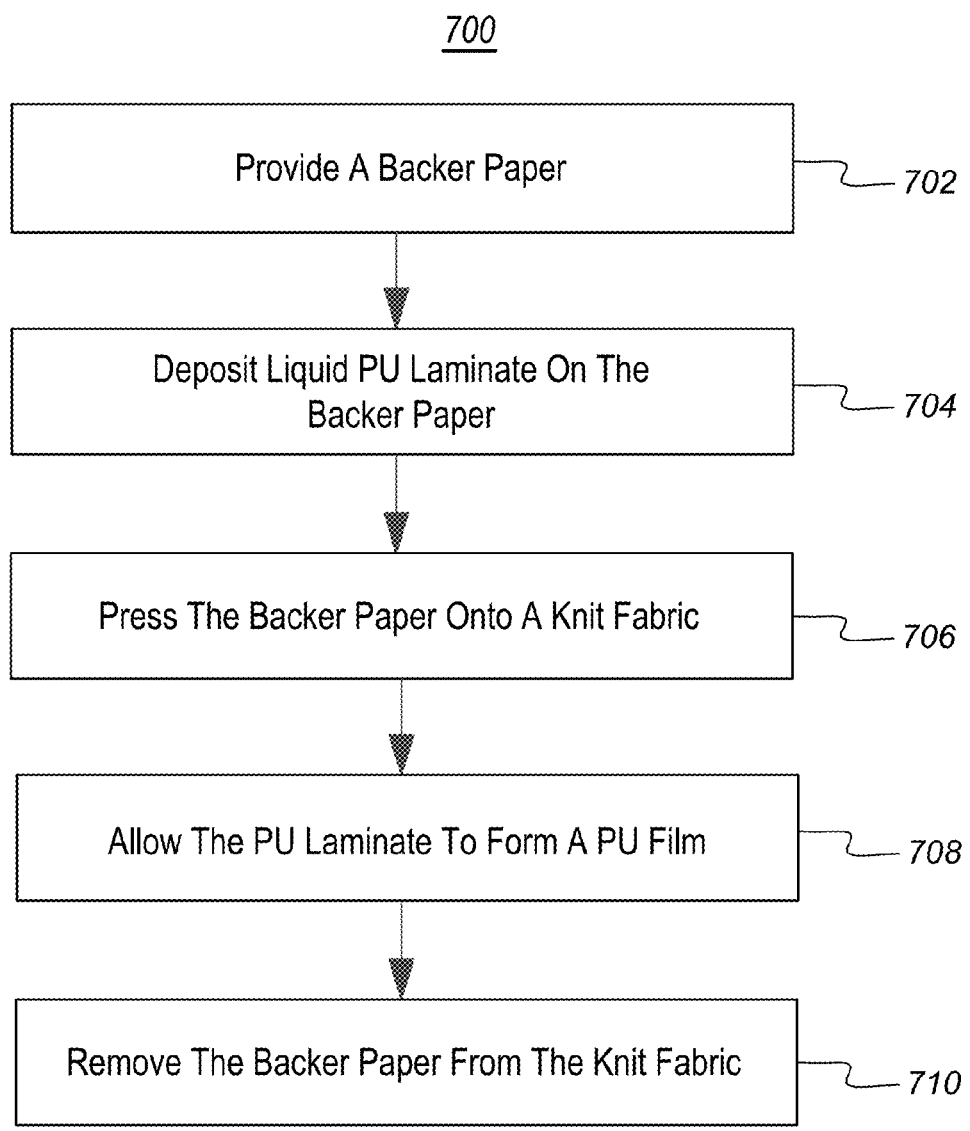
FIG. 7 is a flow chart illustrating a method of creating a PU film in a knit fabric.

FIG. 7 is a flow chart illustrating a method 700 of creating a PU film in a knit fabric. The PU film is disposed laterally within the knit fabric. I.e., the PU film is parallel to the surfaces of the knit fabric. The PU film includes a number of properties that make it advantageous in use with a knit fabric. For example, the hardness of the PU film can be adjusted and the film can be elongated. I.e., the PU film undergoes elongation before breaking. The PU film also has excellent memory, meaning that it will return to its original dimensions after being stretched to its limit. Further, the PU film retains its original performance characteristics including its tensile strength. Moreover, the PU film can be colored with a dye, making it easily identifiable when on the knit fabric. Additionally or alternatively, the PU film can be extremely thin. For example, the PU film can be between 0.1 and 0.2 millimeters thick.

FIG. 7 shows that the method 700 can include providing 702 a backer paper. The backer paper is configured to secure a laminate in place while it solidifies, allowing for a repeatable laminate to be placed in the knit fabric. The backer paper can include paper or any other suitable material. For example, the backer paper can include a waxed paper which protects the laminate from adhering to the backer paper.

FIG. 7 also shows that the method 700 can include depositing 704 liquid PU laminate on the backer paper. Polyurethane is a polymer composed of a chain of organic units joined by carbamate (urethane) links. The liquid PU laminate includes both monomers that will form the PU film and solvents that prevent polymer formation (which allows the laminate to remain stable).

FIG. 7 further shows that the method 700 can include pressing 706 the backer paper onto a knit fabric. I.e., the backer paper and the knit fabric and pressed together saturating the portion of the knit fabric nearest the backer paper with the liquid PU laminate. Force, such as a roller, can be used to ensure that the backer paper and the knit fabric remain in proximity to one another if so desired.

FIG. 7 additionally shows that the method 700 can include allowing 708 the PU laminate to form a PU film. In particular, as the solvent evaporates, the PU laminate forms a solid film which is left behind in the knight fabric. The PU film forms a water impermeable barrier that will secure the hardening material within the knit fabric. I.e., the liquid PU laminate will ensure that the hardening material remains in place after activation until the hardening material has hardened, securing inanimate objects, as described above.

FIG. 7 moreover shows that the method 700 can include removing 710 the backer paper from the knit fabric. I.e., after the liquid PU laminate forms a film, the backer paper can then be removed, leaving the film in place. The backer paper can be "peeled" from the knit fabric, like backer paper removed from a sticky tape. The backer paper can then be reused if so desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of manufacturing a repair wrap for repairing or strengthening an item, the method of manufacturing a repair wrap comprising:
   providing a fabric, wherein the fabric includes one or more fibers;
   creating a film disposed laterally within the fabric by placing the fabric in a liquid polyurethane laminate including monomers that will form a polyurethane film and a solvent, the liquid polyurethane laminate hardening to form the polyurethane film; and
   impregnating a hardening material within the fabric, wherein the hardening material is impregnated after the polyurethane film has been created;
   wherein the fabric is configured to be wrapped around a portion of an item; and
   wherein the hardening material is configured to form a shell about the portion of the item when cured.

2. The method of manufacturing a repair wrap of claim 1, wherein the one or more fibers include at least one of:
   fiberglass fibers;
   carbon fiber;
   a para-aramid fiber with the molecular formula [—CO—C6H4—CO—NH—C6H4—NH-]n;
   aramid fibers;
   para-aramid fibers;
   basalt fibers;
   natural fibers;
   polyester; or
   nylon.

3. The method of manufacturing a repair wrap of claim 1, wherein the area density of the fabric is between 180 grams per square meter and 450 grams per square meter.

4. The method of manufacturing a repair wrap of claim 1, wherein impregnating a hardening material within the fabric includes pressing the hardening material into the fabric using one or more rollers.

5. A method of manufacturing a repair wrap for repairing or strengthening an item, the method of manufacturing a repair wrap comprising:
   providing a fabric, wherein the fabric includes:
      one or more fibers; and
      the one or more fibers are knit to form the fabric;
   creating a film disposed laterally within the fabric, the film forming a water tight barrier within the fabric, wherein creating the film includes:
      positioning a liquid polyurethane laminate within the fabric, the liquid polyurethane laminate including monomers that will form a polyurethane film and a solvent; and
      allowing the liquid polyurethane laminate to solidify into the polyurethane film; and
   impregnating a resin within the fabric, wherein the resin is:
      impregnated after the film has solidified from the laminate;
      water activated;
      configured to cure in exposure to air; and
      unable to pass through the film;
   wherein the fabric is configured to be wrapped around a portion of an item; and
   wherein the resin is configured to form a shell about the portion of the item when cured.

6. A method of manufacturing a repair wrap for repairing or strengthening an item, the method of manufacturing a repair wrap comprising:
   providing a fabric, wherein the fabric includes:
      one or more fibers; and
      the one or more fibers are knit to form the fabric;
   creating a polyurethane film, wherein the polyurethane film:
      is disposed laterally within the fabric;
      is parallel to the surface of the fabric; and
      forms a water tight barrier within the fabric;
   wherein creating the polyurethane film includes:
      positioning a liquid polyurethane laminate within the fabric, the liquid polyurethane laminate including monomers that will harden to form the polyurethane film and a solvent; and
      solidifying the liquid polyurethane laminate to form the film; and
   impregnating a resin within the fabric, wherein the resin is:
      impregnated after the film has solidified from the laminate;
      disposed on either side of the polyurethane film;
      water activated; and
      configured to cure in exposure to air;
   wherein the polyurethane film remains intact after the resin is impregnated;
   wherein the fabric is configured to be wrapped around a portion of an item; and
   wherein the resin is configured to form a shell about the portion of the item when cured.

7. The method of manufacturing a repair wrap of claim 5, wherein the resin includes an additive disposed in the resin.

8. The method of manufacturing a repair wrap of claim 7, wherein the additive includes at least one of:
   plastic;
   rubber;
   sand;
   wood particles;
   sawdust;
   fibrous material; or
   polyester fibrous material.

9. The method of manufacturing a repair wrap of claim 5, wherein the item comprises at least one of:
   wood;
   metal;
   glass;
   plastic;
   rubber;
   non-biological composites;
   fiberglass;
   ceramic; or
   concrete.

10. The method of manufacturing a repair wrap of claim 5, wherein the ratio of resin to fabric by weight is between 29 percent and 44 percent.

11. The method of manufacturing a repair wrap of claim 10, wherein the ratio of resin to fabric by weight is approximately 36.5 percent.

12. The method of manufacturing a repair wrap of claim 6, wherein the resin includes:
   methylene diphenyl diisocyanate.

13. The method of manufacturing a repair wrap of claim 12, wherein the resin includes:
   a two part epoxy.

14. The method of manufacturing a repair wrap of claim 12, wherein the gauge of the knit fabric is between 11 stitches per inch and 17 stitches per inch.

15. The method of manufacturing a repair wrap of claim 14, wherein the gauge of the knit fabric is approximately 14 stitches per inch.

16. The method of manufacturing a repair wrap of claim 12, wherein the polyurethane film includes a dye, the dye configured to change the color of the polyurethane film.

17. The method of manufacturing a repair wrap of claim 12, wherein the polyurethane film is between 0.1 and 0.2 millimeters thick.

18. The method of manufacturing a repair wrap of claim 12, wherein creating the polyurethane film includes:
   providing a backer paper;
   depositing the liquid polyurethane laminate on the backer paper;
   pressing the backer paper onto the fabric;
   allowing the polyurethane laminate to form the polyurethane film, wherein allowing the polyurethane laminate to form the polyurethane film includes:
      allowing the solvent to evaporate; and
      removing the backer paper from the knit fabric.

* * * * *